United States Patent Office 3,029,268
Patented Apr. 10, 1962

3,029,268
THIOETHER CONTAINING ESTERS OF DITHIO-
PHOSPHORIC ACID, AND SALTS THEREOF
Fred Corwin Goldsmith, Painesville, Ohio, assignor to
The Lubrizol Corporation, Wickliffe, Ohio, a corporation of Ohio
No Drawing. Filed Sept. 10, 1959, Ser. No. 839,081
8 Claims. (Cl. 260—429.9)

This invention relates to organic thiophosphorus acids and in a more particular sense it relates to a particular class of phosphorodithioic acids. It relates also to lubricating compositions which have improved properties with respect to corrosion inhibitors because of the presence therein of small amounts of these phosphorodithioic acids.

This application is a continuation-in-part of application Ser. No. 326,605, filed December 17, 1952, and now U.S. 2,905,683.

Organic phosphorus-containing compounds are known to have utility as lubricant additives. Most of such organic phosphorus compounds acts as inhibitors of corrosion and oxidation when used in small amounts in lubricating compositions and many others act also as dispersants, i.e., they serve to preserve in suspension the foreign particles which inevitably accumulate in a crankcase lubricant.

Phosphorodithioic acids in particular have achieved a distinct status in the field of lubrication chemistry because their metal salts are very effective corrosion inhibitors for lubricants. The phosphorodithioic acids most frequently employed for this purpose are those which contain alkyl groups as the organic residue, or alternatively alkylphenyl groups as this organic residue. Such compounds are illustrated by the structural formula

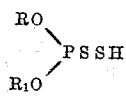

where R and $R_1$ are as indicated above, either alkyl or alkylphenyl groups. Such compounds are prepared by the well known reaction of alcohols or phenolic compounds with phosphorus pentasulfide and the particular utility of these phosphorodithioic acids is based upon a combination of factors including principally the low cost of alcohols and alkyl phenols, and also upon the oil solubility and effectiveness of their metal salts as corrosion inhibitors.

Phosphorodithioic acids have found many other uses also. They generally are useful in ore flotation processes, as intermediates in the preparation of insecticides, and in other such applications.

It is a principal object of this invention to provide a novel class of phosphorodithioic acid salts.

Another object of this invention is to provide corrosion inhibitors for use in lubricating compositions.

Another object of the invention is to provide a novel class of phosphorodithioic acid salts which are characterized by the presence therein of thioether groups.

These and other objects of the invention are provided by oil soluble metal salts of a phosphorodithioic acid having the structure

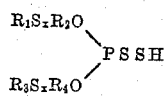

where $R_1$ and $R_3$ are aliphatic radicals and $R_2$ and $R_4$ are divalent hydrocarbon radicals, and $x$ is an integer from one to six.

The aliphatic groups contemplated as $R_1$ and $R_3$ include principally alkyl and alkenyl groups. These are illustrated by methyl, ethyl, butyl, hexyl, decyl, tetradecyl, eicosyl, isobutenyl, decenyl, octadecenyl and keryl (derived by abstraction of a hydrogen from kerosene). Cycloalkyl groups likewise are contemplated, as are cycloalkenyl groups. Other aliphatic radicals within the scope of this invention include the halo-substituted alkyl and alkenyl radicals such as chloroamyl, chlorooctyl, bromodecyl, fluoroethyl, and chlorodiisobutenyl. Other inert substituents may likewise be present in these aliphatic groups; such substituents are ether, ester, nitro, sulfide, etc. groups.

The divalent hydrocarbon radicals, represented by $R_2$ and $R_4$, are generally ethylene or propylene. Higher molecular weight divalent hydrocarbons likewise are considered within the scope of the invention and these include phenylene groups, butylene, hexylene and similar groups. The nature of the sulfide linkages in the products of this invention is indicated by the subscript denoting the number of sulfur atoms in each sulfide linkage. In most cases these sulfide linkages are either monosulfides or disulfides. In some instances, however, they may consist of more than two sulfur atoms and in some rare cases they may actually comprise as many as six sulfur atoms. Thus all sulfides, ranging from the monosulfides up through the hexasulfides, are contemplated as within the scope of this invention.

A wide range of metals is available for use in the preparation of the metal salts of these compositions. They include both the light and heavy metals, for example, sodium, lithium, potassium, barium, calcium, strontium, magnesium, zinc, cadmium, copper, iron, lead, chromium, tin, nickel, aluminum and cobalt salts. Preference is given to the barium, zinc and lithium salts, with special preference being given to the zinc salts.

The phosphorodithioic acids of this invention may be prepared most conveniently by mixing and heating phosphorus pentasulfide with from 3 to 8 moles or preferably about 4 moles of an alcohol having the structural formula $R_1S_xR_2OH$ where $R_1$ is an aliphatic radical as described above, $R_2$ is a divalent hydrocarbon radical also as described above, and $x$ is an integer from one to six. The period of heating is continued until the evolution of hydrogen sulfide has subsided. The reaction can be carried out under reduced pressure to remove the evolved hydrogen sulfide from the reaction mixture or it can be carried out at atmospheric pressure. Suitable temperatures for the reaction are within the range of ambient temperatures and 200° C., with a preference for temperatures between about 50° C. and 120° C. The time required for completion of the reaction depends upon the temperature and pressure employed and may vary from 0.5 to 4 or more hours. If desired, an inert solvent may be added to the reaction mixture either before or after the reaction to facilitate handling. The crude product can be decanted or filtered from any unreacted phosphorus pentasulfide which may in some instances remain.

Metal salts of the above acids can be prepared simply by neutralization of the above product with a suitable salt-forming metal base or by well-known double decomposition procedures by which a solution of a monovalent metal phosphorodithioic acid is treated with a salt of a polyvalent metal.

The preparation of such acids having a symmetrical structure can be accomplished by the use of a single alcohol of the formula indicated above in the reaction with phosphorus pentasulfide. Such a reaction yields a product in which the organic groups are identical, and the resulting acid can then be neutralized with a metal base to give the corresponding metal salt. Unsymmetrical, or mixed salts can be prepared by any of the following methods:

(1) The reaction of phosphorus pentasulfide with a mixture of alcohols having the structure R₁SₓR₂OH, followed by reaction of the resulting acid with a basic metal compound;

(2) Reaction of phosphorus pentasulfide with one alcohol having the structure R₁SₓR₂OH to form the symmetrical, or simple acid, preparing a mixture of this simple acid with another different simple or mixed unsymmetrical acid, and then neutralizing this mixture with basic polyvalent metal compound.

The latter method can result in the formation of unsymmetrical salts, symmetrical salts, and/or mixtures of these two types.

The preparation of the metal phosphorodithioates of this invention is illustrated in greater detail by the following examples.

EXAMPLE 1

*Preparation of*

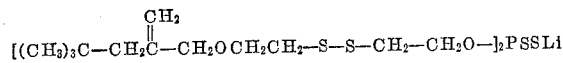

A mixture of 308 g. of bis-(2-hydroxyethyl) disulfide and 883 g. of diisobutenyl chloride was treated portionwise over a period of 30 minutes at 145–155° C. with 80 g. of sodium hydroxide, and then heated for an additional three hours at 150–170° C., at which point the evolution of water had ceased. The cooled mixture was washed three times with water and then dried at 70° C./20 mm. The dried product was filtered yielding 461 g. of a dark brown liquid. Four hundred and twelve grams of this product was mixed with 86.5 g. of phosphorus pentasulfide and heated at 80–90° C. for three hours. The product was treated with a siliceous filter aid and filtered, yielding 320 g. of a brown, slightly viscous liquid.

One hundred and forty grams of this 2-hydroxyethyl diisobutenoxy-ethyl disulfide-phosphorus pentasulfide condensation product was mixed with 5.1 g. of lithium hydroxide monohydrate and heated for two hours at 60° C., then for 1.5 hours at 100° C./30 mm. The residue was treated with a siliceous filter aid and filtered, yielding 117 g. of a dark, slightly viscous liquid which was shown to have the following composition.

Percent sulfur _____ 28.2
Percent phosphorus _____ 4.76
Percent lithium _____ 0.41

EXAMPLE 2

*Preparation of*

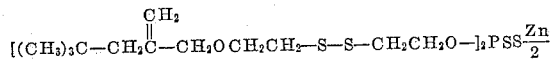

One hundred and forty-seven grams of the 2-hydroxyethyl diisobutenoxy-ethyl disulfide-phosphorus pentasulfide condensation product described in Example 1 was mixed with 5.3 g. of zinc oxide and 15 cc. of methanol and heated at 60° C. for two hours. The product was dried at 100° C./30 mm. for 1.5 hours, treated with a siliceous filter aid and filtered. The filtrate was a dark, non-viscous liquid, which weight was 62 g. and was shown to have the following composition.

Percent phosphorus _____ 2.46
Percent zinc _____ 0.45

EXAMPLE 3

*Preparation of*

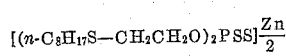

To a mixture of 277 grams of n-octyl mercaptan and 0.15 gram of sodium there was added at 175–200° C. during a period of five hours 115 grams of ethylene oxide.

The reaction mixture then was distilled to yield a principal fraction (n-octyl beta-hydroxyethyl sulfide) boiling at 142–148° C./10 mm.

A mixture of 95 grams of the above hydroxyalkyl sulfide, 28 grams of phosphorus pentasulfide and 95 grams of toluene was heated for 4 hours at 50–60° C. The resulting product had a neutralization number of 67.4, identifying it as the expected phosphorodithioic acid.

To a mixture of 208 grams of the above phosphorodithioic acid and 300 grams of water there was added 10.8 grams of zinc oxide and then 300 ml. of toluene. This mixture was heated at 50–60° C. for 4 hours and then filtered through a siliceous filter aid. The filtrate was concentrated by heating to 70° C./12 mm. and the residue filtered again. This filtrate was identified by analyses as the expected zinc phosphorodithioate.

Percent sulfur _____ 25.4
Percent phosphorus _____ 4.6
Percent zinc _____ 3.7

The product prepared as thus described may be added directly to lubricating oils. These compounds act as inhibitors, detergents, film strength improvement agents, etc. Ordinarily, only a small proportion of the dithiophosphates of this invention is necessary in a lubricating oil to impart to the oil the representative characteristics desired. Other addition agents may be also employed in the lubricating oils since the phosphorodithioates of this invention do not act contrary to the effects of other additives.

While the phosphorodithioates of the present invention are useful per se as improving agents for lubricating compositions, especially mineral lubricating oils intended for use in crankcases of internal combustion engines, they are most advantageously employed in combination with one or more additional improving agents of the prior art such as: e.g., the numerous prior art oxidation inhibitors, detergents, extreme-pressure agents, rust inhibitors, and oiliness agents.

In addition to the above-named cooperating improving agents, the present invention also contemplates the inclusion in the finished lubricant of materials intended to modify the physical characteristics of the mineral lubricating oil base. Examples of such materials are foam inhibitors, pour depressants, viscosity index improving agents, and odor improving agents. Since the types of materials useful as physical property improving agents are well-known to those versed in the lubricant art, it is deemed unnecessary to lengthen the present specification unduly by a recitation of the same.

Particularly effective lubricating oils for the crankcases of internal combustion engines can be made by incorporating, in suitable mineral lubricating oil bases, in combination with the phosphorodithioates of the present invention, the oil-soluble metal salts of petroleum sulfonic acids (generally known in the art as "mahogany acids"), and/or phosphorus sulfide treated unsaturated organic materials.

The metal salts of petroleum sulfonic acids can be the light and heavy metal salts with special preference given to the alkaline earth metal salts. The metal salts of petroleum sulfonic acids can be the overbased type or metal complexes disclosed in co-pending applications Ser. No. 216,101, filed March 16, 1951; Ser. No. 216,103, filed March 16, 1951; Ser. No. 224,458, filed May 5, 1951; Ser. No. 263,961, filed December 28, 1951; Ser. No. 263,963, filed December 28, 1951; Ser. No. 276,462, filed March 13, 1952; the first-mentioned of these applications has been abandoned; the rest, in the order mentioned, have issued as U.S. 2,616,924; 2,695,910; 2,616,925; 2,616,904, and 2,616,905, and Ser. No. 279,258 filed March 28, 1952.

In lieu of the mahogany sulfonates or in admixture therewith, other oil-soluble sulfonates, may be used such as; e.g., metal sulfonates of alkylated naphthalenes, alkylated benzenes, alkylated phenols, and the like, such as can be found in the prior art. Usually however, the "mahogany" sulfonates are preferred for reasons of their availability and excellence.

Phophorus sulfide treated unsaturated organic materials useful in conjunction with the phosphorodithioates of the present invention include; e.g, phosphorus sulfide treated acyclic and cyclic unsaturated hydrocarbons and phosphorus sulfide treated unsaturated esters, acids, and ketones and particularly phosphorus sulfide-treated terpene hydrocarbons. Such phosphorus sulfide-treated materials may be modified by treatment with reagents such as water, alcohols, phenols, or metallic bases to yield end products having enhanced utility for certain applications. Additional information on the preparation and uses of such cooperating improving agents may be had by reference to U.S. Patents 2,278,717; 2,315,529; 2,316,078; 2,316,079; 2,316,080; 2,316,084; 2,316,089; 2,331,923; 2,356,073; 2,356,074; 2,367,468; 2,375,315; 2,377,955; 2,379,312; 2,379,313; 2,383,494; 2,383,495; 2,383,498; 2,392,253; 2,406,575; 2,409,877; 2,409,878; 2,216,281; and 2,421,631.

One of the most useful of such phosphorus sulfide treated unsaturated organic materials for use in combination with the phosphorodithioates of the present invention is phosphorus pentasulfide-treated pinene. The pinene may either be the alpha or beta form or a commercial mixture thereof known in the art as turpentine. Such product may be made by reacting from 3 to 6 moles of pinene, preferably 4 or 5 moles thereof, with 1 mole of phosphorus pentasulfide for a period of from 2 to 5 hours at about 130° to 150° C. Since the product is of a viscous nature, it is convenient to add a proportion of a low viscosity mineral oil either prior to reaction or after the product has been formed so as to obtain a fully fluid material which can be handled with ease.

In addition to phosphorus sulfide-treated unsaturated organic materials and oil-soluble metal sulfonates, which products have been found to be of particular utility for use in conjunction with the phosphorodithioates of the present invention in preparing improved lubricants, it is also contemplated to use various other prior art improving agents along with my phosphorodithioates. Many examples of such useful prior art detergents, corrosion inhibitors, and oxidation inhibitors which may be used advantageously in combination with my phosphorodithioates may be found in articles by V. A. Kalichevsky (Petroleum Refiner, volume 28, No. 9, pages 88–93 inclusive, September 1949) and U, Harold Byers (National Petroleum News, February 10, 1939, pages 67–70 inclusive). In the interest of not lengthening the present specification unduly, it is intended that the improving agents therein disclosed be considered as forming a part of my disclosure.

The additives to be employed in the lubricating oils are preferably used in the following proportions:

| Additive | Broad range, percent | Intermediate range, percent | Preferred range, percent |
| --- | --- | --- | --- |
| The phosphorodithioates of this invention. | 0.1 to 5 | 0.2 to 2 | 0.3 to 1. |
| Polyvalent salt of oil-soluble sulfonic acid (preferably mahogany acids). | 0.05 to 10 | 0.05 to 2 | 0.1 to 1. |
| Other additives | 0.01 to 10 | 0.03 to 5 | 0.05 to 1. |

The phosphorodithioates di-esters of this invention preferably contain at least one ester radical of at least 6 carbon atoms and most desirably of at least 8 carbon atoms. The combined total of carbon atoms in the phosphorodithioates di-ester molecule is preferably at least 12 per atom of phosphorus. Compounds of these types have been found to be satisfactorily soluble and stable in lubricating oils.

The utility of the composition of this invention is demonstrated by the results of Lauson Engine Test in which the test lubricant contains 1% of a zinc phosphorus as shown in Example 2. The Lauson Engine Test is based upon the performance of a lubricant in a 2½ H.P. single cylinder, liquid cooled gasoline engine rated at 1,800 r.p.m. The operating conditions of the test are described in pending application Serial No. 326,605, filed December 17, 1952. The above described lubricant containing as an additive the composition of this invention gives a satisfactory rating as regards piston cleanliness, including ring filling and corrosion (bearing weight loss).

Other modes of applying the principle of the invention may be employed, change being made as regards the details described, provided the features stated in any of the following claims, or the equivalent of such, be employed.

I therefore particularly point out and distinctly claim as my invention:

1. The oil-soluble metal salts of a phosphorodithioic acid having the structure

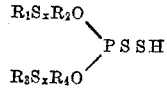

where $R_1$ and $R_3$ are aliphatic radicals selected from the class consisting of alkyl and alkoxyalkyl radicals, $R_2$ and $R_4$ are divalent hydrocarbon radicals selected from the class consisting of lower alkylene and phenylene radicals, and $x$ is an integer from 1 to 6.

2. The zinc salts of a phosphorodithioic acid having the structure

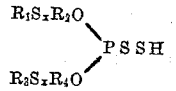

where $R_1$ and $R_3$ are aliphatic radicals selected from the class consisting of alkyl and alkoxyalkyl radicals, $R_2$ and $R_4$ are lower alkylene radicals and $x$ is an integer from 1 to 6.

3. The zinc salts of claim 2 characterized further in that $R_1$ and $R_3$ are alkyl radicals.

4. The zinc salts of claim 2 characterized further in that $R_1$ and $R_3$ are octyl radicals.

5. The zinc salts of claim 4 characterized further in that $x$ is 1.

6. The zinc salts of claim 5 characterized further in that $R_2$ and $R_4$ are ethylene radicals.

7. The zinc salts of claim 2 characterized further in that $R_1$ and $R_3$ are alkoxyalkyl radicals.

8. The zinc salts of claim 7 characterized further in that $x$ is 1.

No references cited.